United States Patent
Miryekta et al.

(10) Patent No.: US 8,408,443 B2
(45) Date of Patent: Apr. 2, 2013

(54) MODULAR FRICTION WELDING HEAD AND ASSOCIATED SYSTEMS AND METHODS

(75) Inventors: Ray Miryekta, Kent, WA (US); Christopher M. Gil, Kent, WA (US)

(73) Assignee: Blue Origin, LLC, Kent, WA (US)

( * ) Notice: Subject to any disclaimer, the term of this patent is extended or adjusted under 35 U.S.C. 154(b) by 0 days.

(21) Appl. No.: 12/708,474

(22) Filed: Feb. 18, 2010

(65) Prior Publication Data
US 2010/0213244 A1 Aug. 26, 2010

Related U.S. Application Data

(60) Provisional application No. 61/153,957, filed on Feb. 19, 2009.

(51) Int. Cl.
*B23K 20/12* (2006.01)
(52) U.S. Cl. .......... 228/2.1; 228/2.3; 228/112.1
(58) Field of Classification Search .......... 228/2.1, 228/112.1, 2.3
See application file for complete search history.

(56) References Cited

U.S. PATENT DOCUMENTS

| | | | |
|---|---|---|---|
| 5,575,402 A | 11/1996 | Botsolas | |
| 6,199,745 B1 | 3/2001 | Campbell et al. | |
| 6,450,395 B1 * | 9/2002 | Weeks et al. | 228/112.1 |
| 6,742,697 B2 | 6/2004 | McTernan et al. | |
| 6,908,690 B2 | 6/2005 | Waldron et al. | |
| 7,448,528 B2 * | 11/2008 | Forrest et al. | 228/112.1 |
| 7,461,769 B2 | 12/2008 | Waldron et al. | |
| 7,464,852 B2 | 12/2008 | Waldron et al. | |
| 7,748,592 B2 * | 7/2010 | Koga et al. | 228/2.1 |
| 2002/0190103 A1 * | 12/2002 | Yoshinaga | 228/112.1 |
| 2004/0129763 A1 * | 7/2004 | Burford et al. | 228/112.1 |
| 2008/0256960 A1 | 10/2008 | Greason et al. | |

OTHER PUBLICATIONS

International Search Report and Written Opinion; International Patent Application No. PCT/US10/024623; Filed Feb. 18, 2010; Blue Origin, LLC; Mailed Apr. 19, 2010 (14 pgs.).

* cited by examiner

*Primary Examiner* — Devang R Patel
(74) *Attorney, Agent, or Firm* — Perkins Coie LLP (57) ABSTRACT

Modular friction welding heads and associated systems and methods are disclosed herein. A friction welding system in accordance with a particular embodiment includes a carrier fixture positioned to carry a workpiece, a head support positioned proximate to the carrier fixture, and a modular friction welding head releasably carried by the head support. At least one of the carrier fixture and the head support can have a guide structure with a constrained motion path positioned to guide relative motion between the modular friction welding head and the carrier fixture. A controller can be operatively coupled to the modular friction welding head and programmed with instructions to control the operation of the friction welding head.

15 Claims, 8 Drawing Sheets

MODULAR FRICTION WELDING HEAD AND ASSOCIATED SYSTEMS AND METHODS

CROSS-REFERENCE TO RELATED APPLICATION

The present application claims priority to U.S. Provisional Patent Application No. 61/153,957, filed on Feb. 19, 2009 and incorporated herein by reference.

TECHNICAL FIELD

The present disclosure is directed generally to modular friction welding heads and associated systems and methods.

BACKGROUND

Friction stir welding (FSW) is a technique used to weld metal by generating friction at an interface between the welded components, typically with a rotating spindle. This technique has been used in the aerospace industry to weld large components, for example, rocket fuel tanks. While conventional friction stir welding techniques have proven successful, there is a continual need in the industry to improve the efficiency and reduce the cost associated with purchasing and operating these high-value devices.

DETAILED DESCRIPTION

Aspects of the present disclosure are directed generally to modular friction welding heads and associated systems and methods. Specific details of several embodiments of the disclosure are described below with reference to manufacturing a rocket fuel tank to provide a thorough understanding of these embodiments. In other embodiments, these techniques can be used to form other devices. Several details describing structures or processes that are well-known and often associated with friction welding are not set forth in the following description for purposes of brevity. Moreover, although the following disclosure sets forth several embodiments of the invention, several other embodiments can have different configurations or different components than those described in this section. Accordingly, other embodiments may include additional elements and/or may lack one or more of the elements described below with reference to FIGS. 1-7B.

Figure 1:
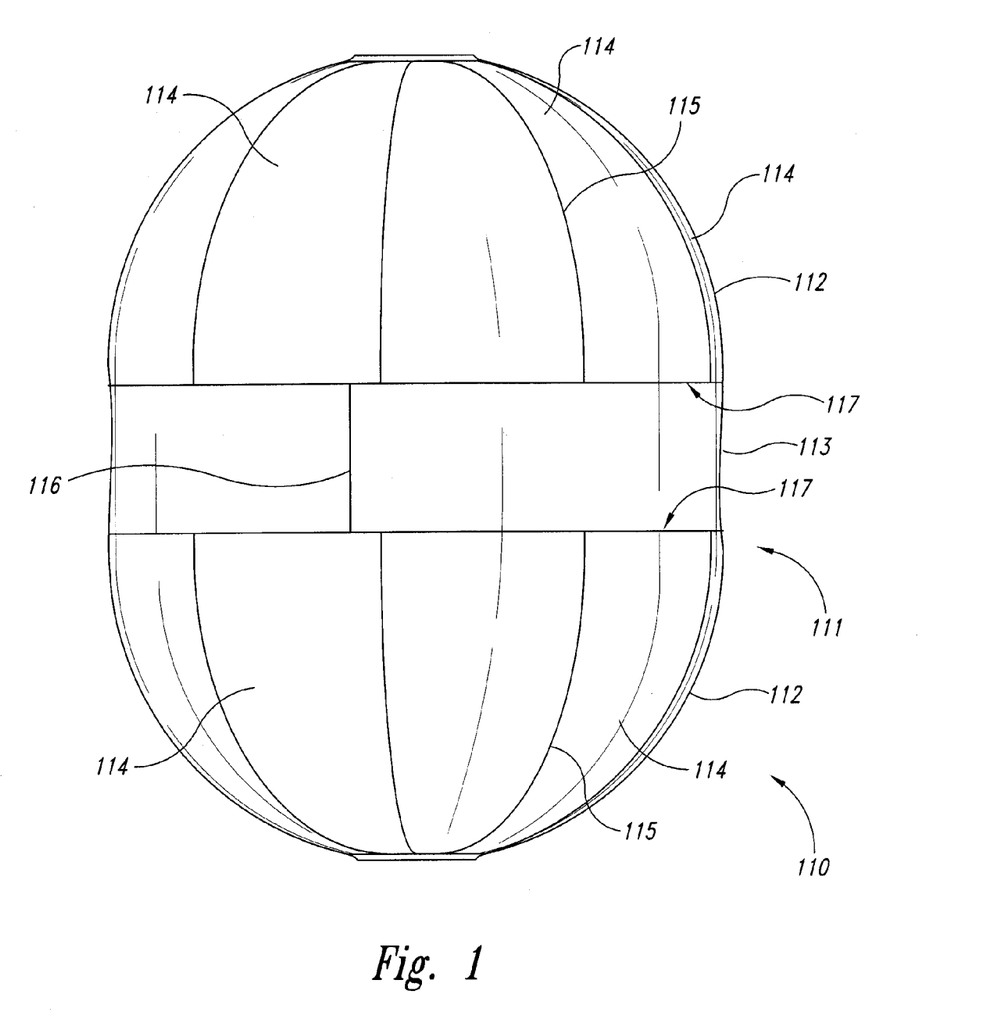
FIG. 1 is a partially schematic side view of a fuel tank that can be formed using techniques and systems in accordance with one or more embodiments of the present disclosure.

FIG. 1 is a partially schematic, side view of a product 110 that can be formed using techniques and devices described further below. In a particular aspect of this embodiment, the product 110 can include a fuel tank 111, for example, a fuel tank suitable for liquid-fueled rockets. The fuel tank 111 can include a cylinder or cylindrical portion 113 connected to oppositely facing domes 112. The cylinder 113 can be formed from a rolled sheet that is welded at a cylinder weld 116. Each of the domes 112 can be formed from multiple gores 114 (each having a partially spherical surface) that are joined to each other at corresponding gore welds 115. Each of the domes 112 is then attached to the intermediate cylinder 113 at a corresponding dome/cylinder weld 117.

Figure 2A:
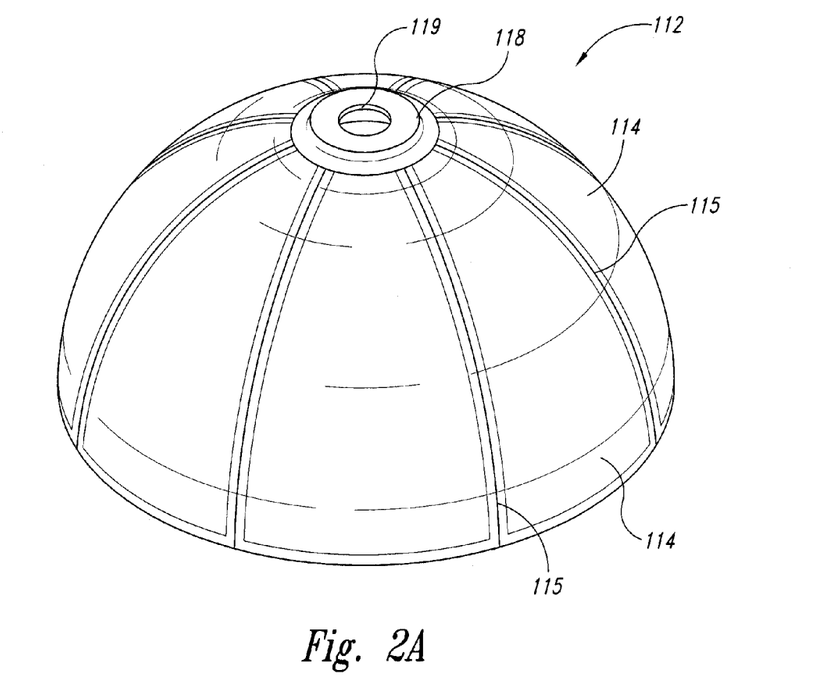
FIGS. 2A-2B are partially schematic illustrations of a fuel tank dome and associated components that can be welded using techniques in accordance with embodiments of the disclosure.

FIG. 2A schematically illustrates portions of the dome 112 shown in FIG. 1, including the gores 114 and the associated gore welds 115. In a particular embodiment, a polar flange 118 (shown in cross-section in FIG. 2B) can be attached to the upwardly facing end of the dome 112, for example, to support attachments to other structures. These attachments can include structural attachments, fuel lines and/or other elements. The polar flange 118 can include a central opening 119 for access into the dome 112.

Figure 2B:
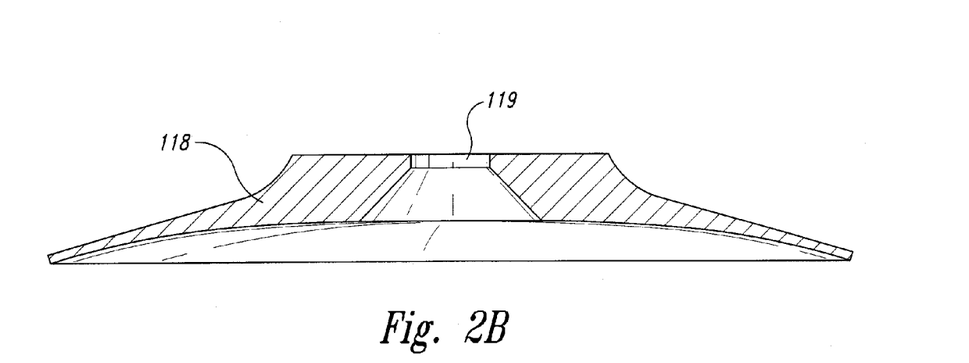

Conventional friction welding techniques typically require three different stations to assemble the fuel tank shown in FIGS. 1 and 2A-2B. These stations include a first station at which the individual gores are welded to form the domes 112, a second station at which the cylinder 113 is welded at the cylinder weld 116, and a third, station at which the domes 112 are attached to the cylinder 113 at the dome/cylinder welds 117. Because each of the foregoing components is typically large and has a high value, each of the foregoing stations typically includes a dedicated friction welding head and controller that are specifically designed only for the particular task at that station. Accordingly, in order to form the fuel tank 111 shown in FIG. 1, a manufacturer must typically purchase and operate three different friction welding devices, each controlled by a corresponding different friction welding controller. While this approach has proven successful in that the single-purpose friction welding heads may be less susceptible to failure because they are tailored to a particular task, the foregoing approach is also expensive and can consume a large amount of factory space. Accordingly, embodiments of the present disclosure are directed to modular friction welding heads that can be moved from one station to another and can accordingly complete a variety of tasks, rather than just a single task.

Figure 3:
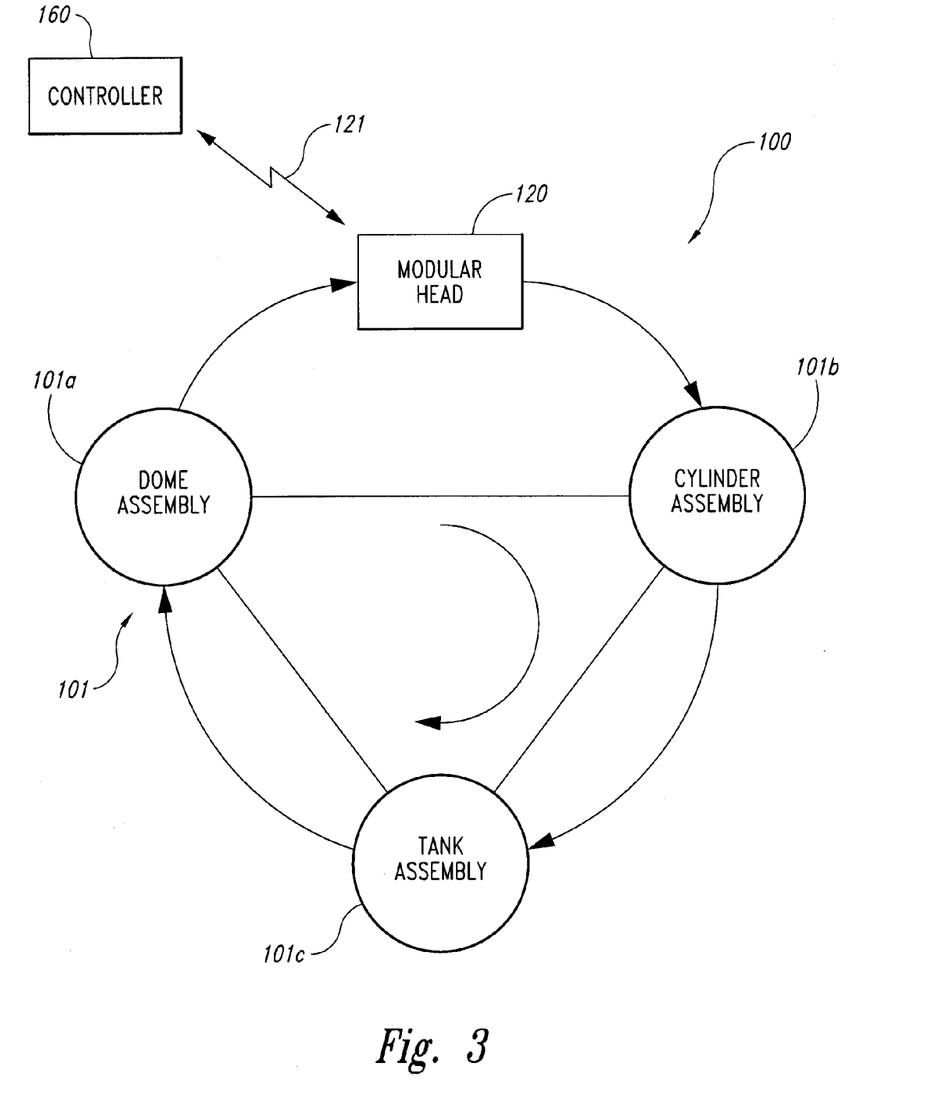
FIG. 3 is a schematic block diagram illustrating a process for welding components using a modular welding head in accordance with embodiments of the disclosure.

FIG. 3 is a flow diagram illustrating three stations 101 associated with manufacturing the fuel tank 111 shown in FIG. 1. These stations 101 can include a dome assembly station 101a, a cylinder assembly station 101b and a tank assembly station 101c. A system 100 in accordance with an embodiment of the disclosure includes a modular friction welding head 120 (e.g., a modular friction stir welding head) that may be moved among the three stations 101a, 101b, 101c, thus reducing or eliminating the need for multiple welding heads. In addition, the modular head 120 can be controlled by a single controller 160, thus reducing or eliminating the need for multiple controllers.

In a particular embodiment, the controller 160 is a computer-based controller that includes hardware and software for executing computer-based instructions. Accordingly, certain embodiments described below may take the form of computer-executable instructions, including routines executed by a programmable computer. Those skilled in the relevant art will appreciate that such embodiments can be practiced on computer systems other than those shown and described below. The controller 160 typically includes one or more processors, memories, and input/output devices, including keyboard(s) and/or display screens or monitors. The controller 160 can remain stationary while the modular head 120 moves from one station 101 to the other. In another embodiment, the controller 160 can be portable. In either embodiment, the controller 160 can be connected to the modular head 120 with a communication link 121, e.g., a flexible communication link. In a particular embodiment, the communication link 121 includes cables, so as to avoid electromagnetic interference that may be associated with a wireless link. However, in other embodiments, the controller 160 can control the modular head 120 with a wireless link, assuming it is suitably noise-free. In any of these embodiments, the controller 160 can control both the welding action and the motion of the modular head 120 at each station 101.

The modular head 120 includes elements typically used to create friction welds, e.g., a pin tool, a spindle that rotates the pin tool to create the friction necessary for welding, and one or two shoulders that control the flow of metal formed during the weld. Further details of a representative modular head 120 are described below with reference to FIGS. 7A-7B. The modular head 120 can be configured to operate with a support structure or tooling that provides support on the backside of the piece that is being welded, or the modular head 120 include a self-reacting device that eliminates the need for such a support. The modular head 120 can include hydraulics or other drivers/actuators that provide the forging force needed to produce the friction weld, or the force can be produced by another device. Suitable devices include an electrically operated device, for example, a linear voltage displacement transducer. The modular head 120 can optionally include a laser tracking device or another vision system, for example, one or more micro-cameras. The modular head 120 can still further include a pigtail or other receiving device to which the communication link 121 described above with reference to the controller 160 is attached. In a particular embodiment, the modular head 120 includes custom-made elements and/or assemblies available from any number of friction stir welding device manufacturers including ESAB of Stockholm, Sweden, Nova-Tech of Lynnwood, Wash., and MTS of Eden Prairie, Minn.

Figure 4A:
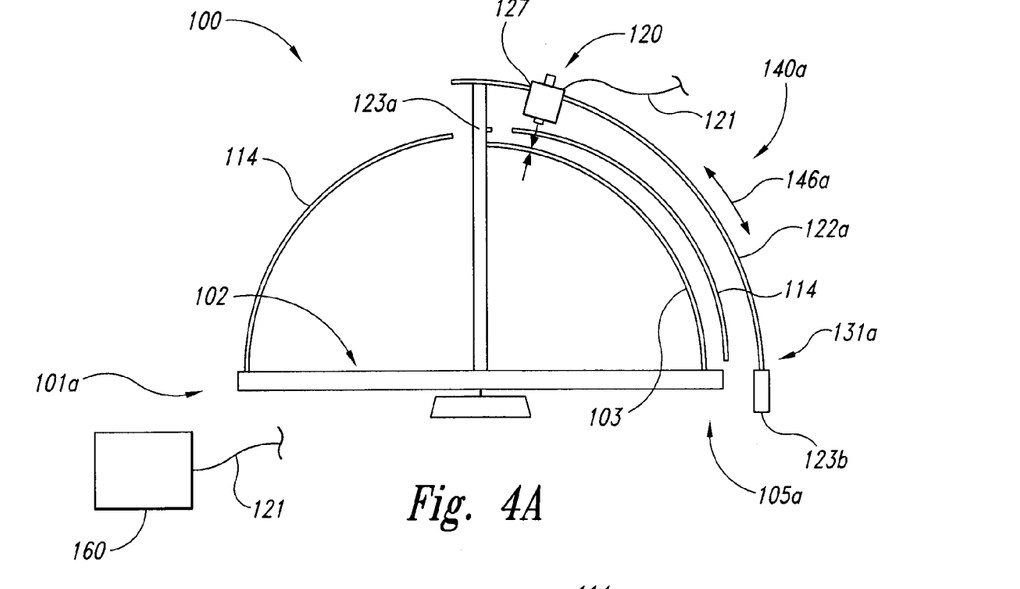
FIGS. 4A and 4B illustrate a technique for welding components of a fuel tank dome in accordance with an embodiment of the disclosure.
Figure 4B:
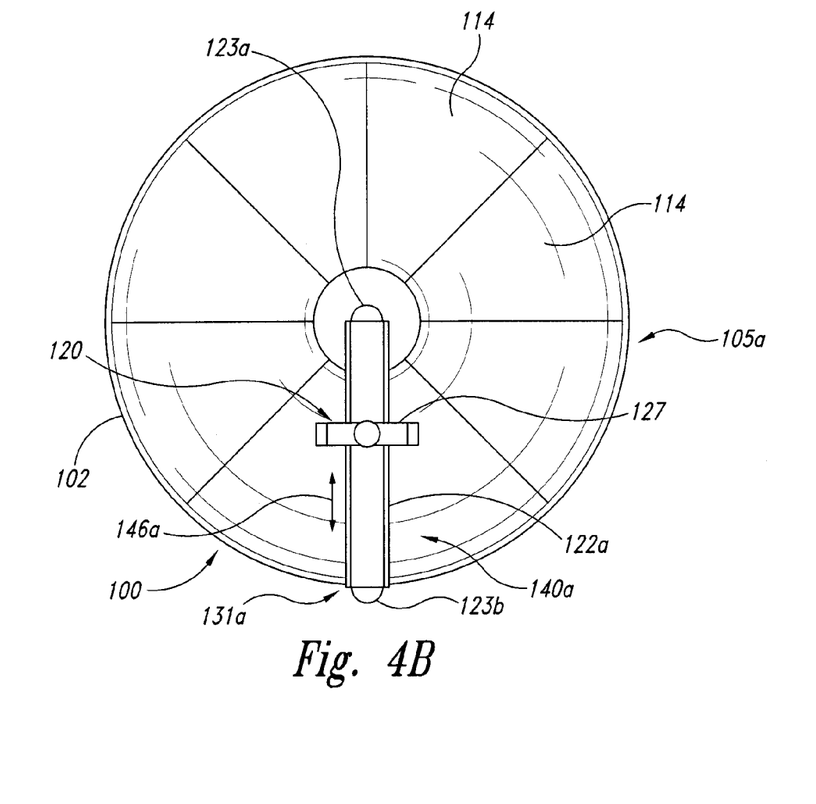

FIG. 4A is a partially schematic, side view illustration of a portion of the system 100 located at the dome assembly station 101a shown in FIG. 3. FIG. 4B is a top view looking down on the system 100 shown in FIG. 4A. In one aspect of an embodiment shown in FIGS. 4A and 4B, the system 100 includes a first carrier fixture 105a that supports multiple gores 114. For example, the first carrier fixture 105a can include a rotary table 102 carrying tooling 103 that in turn supports multiple gores 114. The rotary table 102 can include provisions (e.g., slots) for supporting gores 114 and associated tooling 103 having multiple diameters, thicknesses, or other dimensions. The tooling 103 can be retractable and/or can have other features, e.g., to support multiple functions performed at the dome assembly station 101a. Such functions can include trimming in addition to welding. The system 100 can further include a first guide structure 140a (e.g., a dome track 122a) that carries the modular head 120 for movement relative to the gores 114, and that is supported by a first head support 131a having one or more head support elements 123, e.g., a central support element 123a and an outer or peripheral support element 123b. The central support element 123a can telescope, e.g., to handle gores 114 of different diameters and/or to provide support for the polar flange 118 (FIG. 2B). In general, the first guide structure 140a is positioned close to the expected location of the gores 114 that are to be welded, so as to reduce the extent to which the modular head 120 is cantilevered relative to the dome track 122a. In operation, the modular head 120 includes a carriage 127 or other suitable device that moves along a first constrained motion path 146a as the modular head 120 welds neighboring gores 114. The first constrained motion path 146a is curved or arcuate in the embodiment shown in FIGS. 4A and 4B. The curvature of the first motion path 146a can be in a single plane (e.g., the plane of FIG. 4A), or a transverse plane, or both, depending upon the welding operation to be performed. In any of these embodiments, after an individual weld is completed, the rotary table 102 can rotate to align the next interface between neighboring gores 114 with the first motion path 146a of the modular head 120.

The first guide structure 140a can include any suitable arrangement for supporting the motion of the modular head 120. For example, the first guide structure 140a can include a rack and pinion arrangement attached to a sturdy supporting railing or other structure, as described further below with reference to FIGS. 7A-7B. The rack-and-pinion arrangement can include anti-backlash gearing to improve the accuracy with which the modular head 120 is positioned. In other embodiments, the first guide structure 140a can include a C-channel, an arrangement of rods, and/or another device. In any of these embodiments, the modular head 120 can include a drive motor or other drive device that moves the modular head 120 relative to the associated guide structure. In another embodiment, the drive device can be carried by the first guide structure 140a itself. For example, the first guide structure 140a can include a moving toothed belt, chain, or other "tow rope" type arrangement to which the modular head 120 is connected.

Figure 5A:
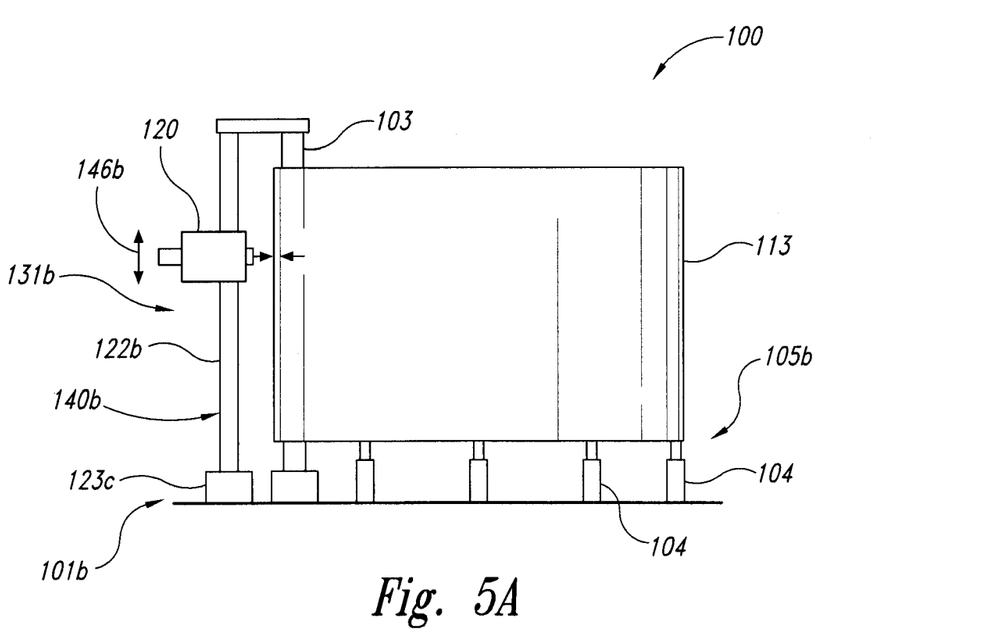
FIGS. 5A and 5B illustrate a technique for welding a cylindrical portion of a fuel tank in accordance with an embodiment of the disclosure.
Figure 5B:
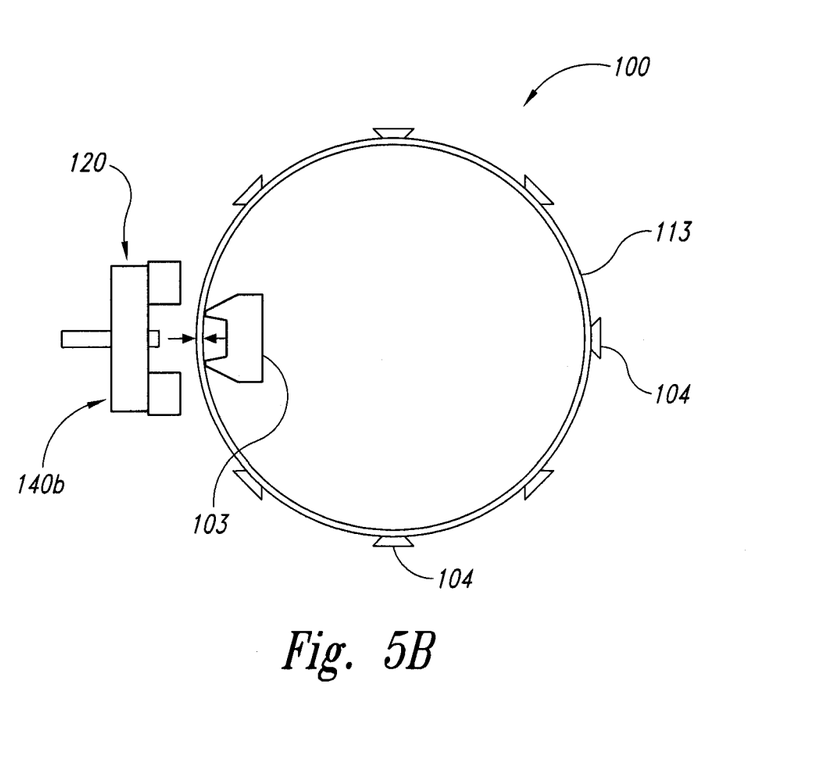

FIG. 5A is a partially schematic, side elevation view of a portion of the system 100 located at the cylinder assembly station 101b shown in FIG. 3. FIG. 5B is a top view of the system 100 shown in FIG. 5A. Referring to FIGS. 5A and 5B, the system 100 can include a second head support 131b that in turn includes a second guide structure 140b (e.g., a cylinder track 122b) that extends upwardly from a base support element 123c adjacent to an outer surface of the cylinder 113. The cylinder track 122b carries the modular head 120, e.g., the same modular head 120 as is used at the dome assembly station 101a (FIG. 4A). Accordingly, the modular head 120 can be detached from the first guide structure 140a (FIGS. 4A and 4B) and removably attached to the second guide structure 140b. The second guide structure 140b defines a second constrained motion path 146b which is a straight line in the embodiment shown in FIGS. 5A-5B. Accordingly, the modular head 120 can operate along both a straight line motion path and a curved motion path. In a particular aspect of this embodiment, cylinder assembly station 101b includes a second carrier fixture 105b that in turn includes assembly tooling 103 positioned at the inner surface of the cylinder 113 to react forces provided by the modular head 120. Optionally, the assembly tooling 103 can be connected to the second guide structure 140b above the cylinder 113 for enhanced support. The second guide structure 140b can have any of the arrangements described above with reference to the first guide structure 140a, and can be positioned close to the cylinder 113 to reduce bending moments. The modular head 120 can perform trimming operations, in addition to welding operations.

If the cylinder 113 includes multiple sections and requires multiple welds, it can be indexed either manually or via a turntable generally similar to that described above with reference to FIGS. 4A and 4B. In another embodiment, the second carrier fixture 105b can include cylinder supports 104 for the cylinder 113. The supports 104 can include fixed stanchions with rollers at the interface with the cylinder 113. In yet another embodiment, the second carrier fixture 105b can include a ring-shaped track that allows the cylinder 113 to rotate relative to the modular head 120. In still another embodiment, the base support element 123c can include a circular track that allows the upwardly projecting cylinder track 122b and the modular head 120 to orbit around the cylinder 113 prior to performing welding or trimming operations at multiple circumferential locations around the cylinder 113.

Figure 6:
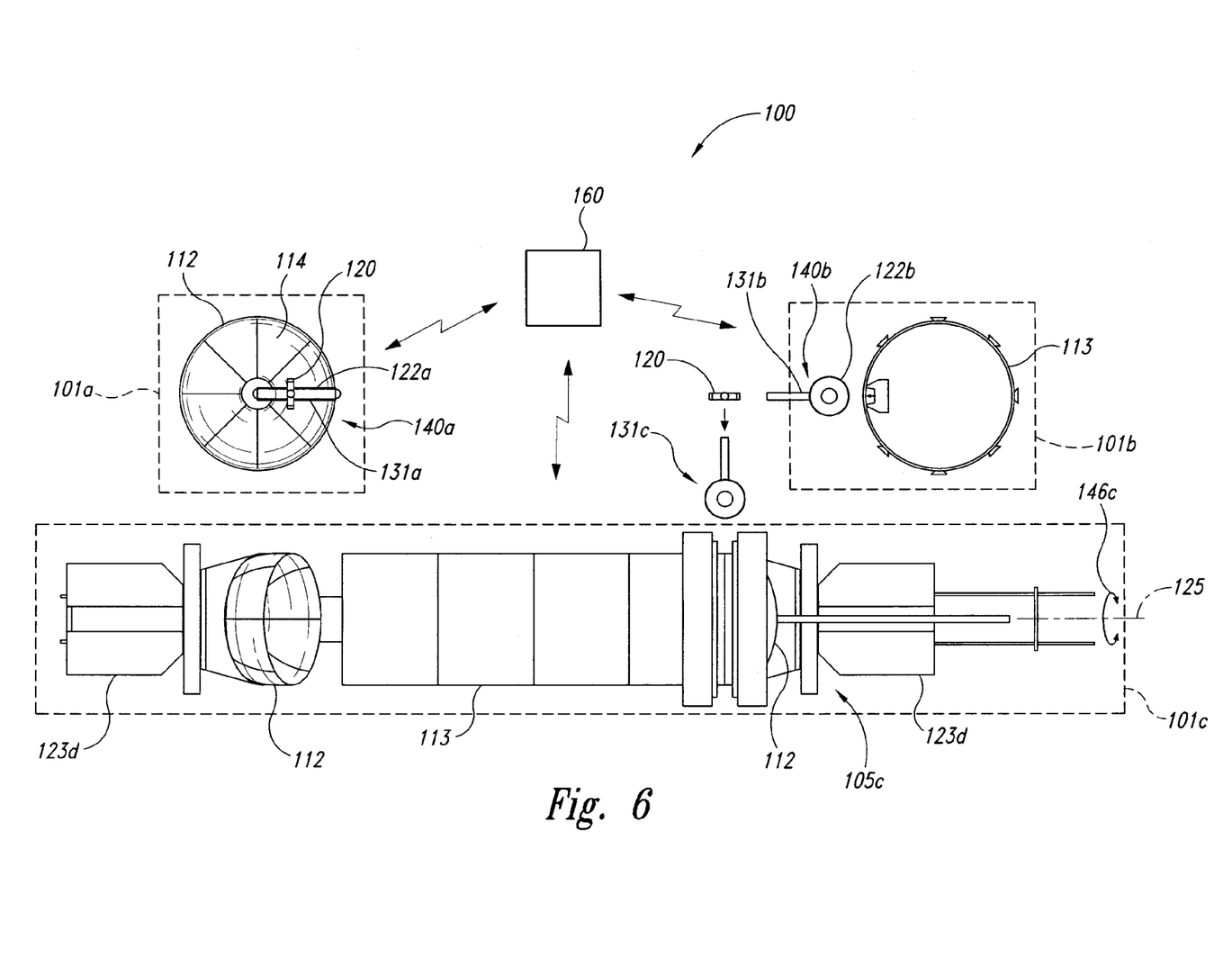
FIG. 6 is an illustration of a process for joining a fuel tank cylinder and a fuel tank dome using techniques in accordance with an embodiment of the disclosure.

FIG. 6 is a partially schematic, top plan view of the system 100 illustrating all three stations 101a, 101b and 101c. As shown in FIG. 6, the modular head 120 can be moved from the first guide structure 140a (e.g., the dome track 122a) at the dome assembly station 101a to the second guide structure 140b (e.g., the cylinder track 122b) at the cylinder assembly station 101b. The modular head 120 can then be moved from the cylinder track 122b to a third head support 131c at the tank assembly station 101c. The third head support 131c can be firmly anchored in place. Accordingly, the modular head 120 can have a fixed position relative to the cylinder 113 and the domes 112 at the tank assembly station 101c. The domes 112 and the cylinder 113 can be carried by a third carrier fixture 105c having one or more rotary supports 123d that rotate these components about a longitudinal axis 125 while the modular head 120 forms the dome/cylinder welds 117 (FIG. 1) at the junctions between the domes 112 and the cylinder 113. The motion of the domes 112 and the cylinder 113 can accordingly be along a third (curved) constrained motion path 146c. The third carrier fixture 105c can translate along the longitudinal axis 125 to sequentially align each dome 112 with the third head support 131c, or the third head support 131c can translate to provide the same alignment. This arrangement can also be used to weld multiple axially-positioned sections of the cylinder 113 together to produce a cylinder that is elongated along the longitudinal axis 125.

Figure 7A:
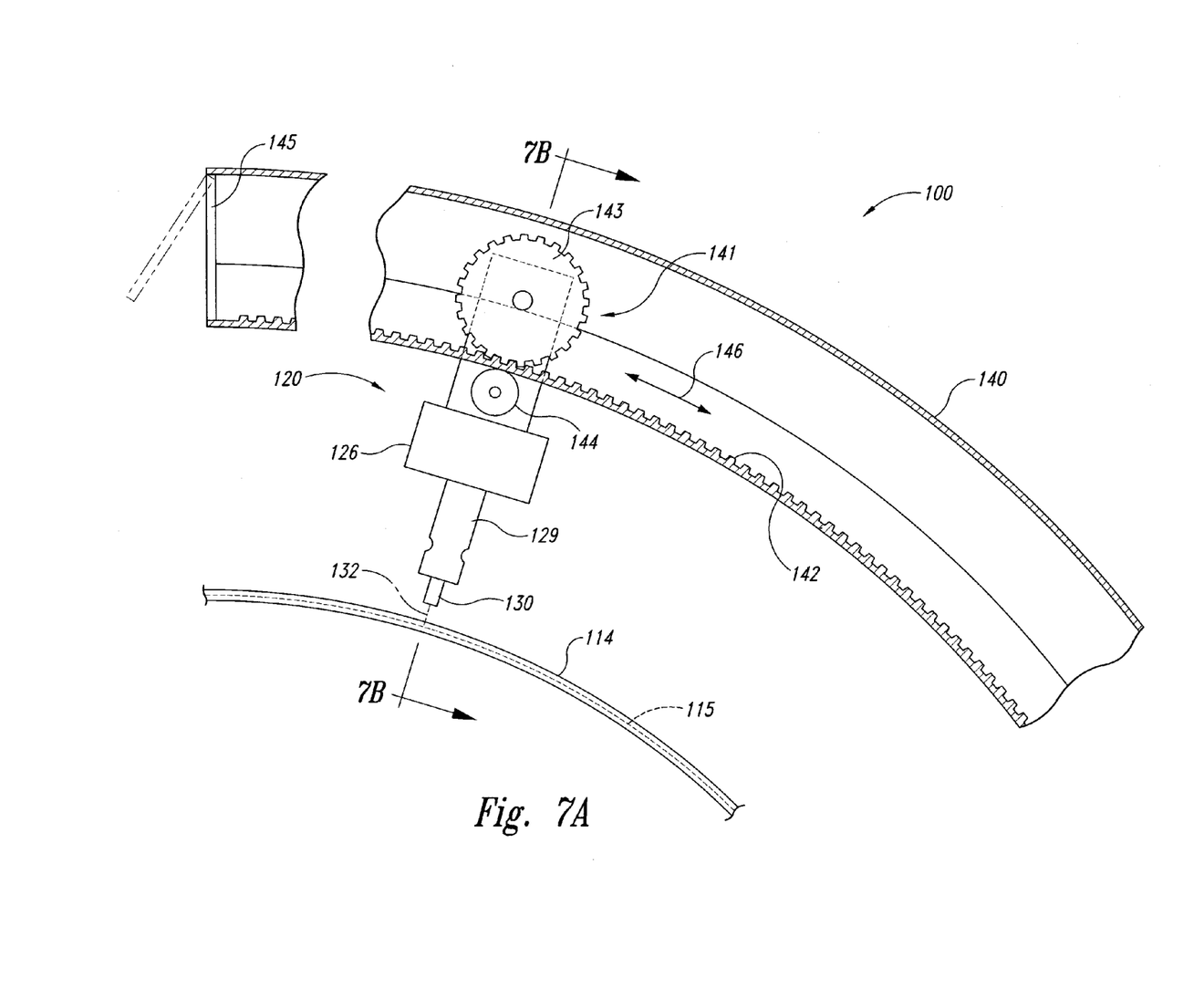
FIG. 7A is a partially schematic side view of a friction welding head and guide structure configured in accordance with an embodiment of the disclosure.

FIG. 7A is a partially schematic, cross-sectional illustration of a guide structure 140 and modular friction welding head 120 configured in accordance with an embodiment of the disclosure. In one aspect of this embodiment, the guide structure 140 describes a curved motion path 146 that is generally parallel to the curved outer surface of the gore 114 upon which the modular head 120 operates. Accordingly, the guide structure 140 can be used at the first station 101a described above. The system 100 can further include engagement features 141, which, in a particular embodiment, include one or more racks 142 carried by the guide structure 140, and one or more corresponding pinions 143 carried by the modular head 120. The engagement features 141 are generally common to multiple guide structures to support the modular, portable aspects of the modular head 120. As discussed above, the pinions 143 can include anti-backlash pinions that increase the repeatability with which the modular head 120 can be located at any point along the motion path 146. The modular head 120 can further include one or more retainer wheels 144 or other devices that engage the outside of the guide structure 140 to help keep the pinions 143 engaged with the racks 142. The modular head 120 can further include a housing 126 that in turn carries a spindle 129 and a friction stir welding probe 130. The spindle 129 and probe 130 rotate about a spindle axis 132 to provide a friction stir weld at the gore 114, in a manner generally known to those of ordinary skill in the relevant art. The motion path 146 can be curved about one or more axes, e.g., one or more axes that are transverse to the spindle axis.

As the modular head 120 travels along the motion path 146 to produce the gore weld 115, it can be prevented from inadvertently traveling off the guide structure 140 by a releasable stop 145. In a particular embodiment, the releasable stop 145 can be disengaged (e.g., by pivoting the stop 145 as shown in dashed lines in FIG. 7A) to allow the modular head 120 to be removed from the guide structure 140 and placed on another guide structure. The modular head 120 can typically weigh thousands of pounds, and is accordingly handled by an overhead crane, lift, or other heavy-duty machinery in a typical embodiment. This arrangement can be adjusted to be more robust or less robust, depending upon the size of the modular head 120.

Figure 7B:
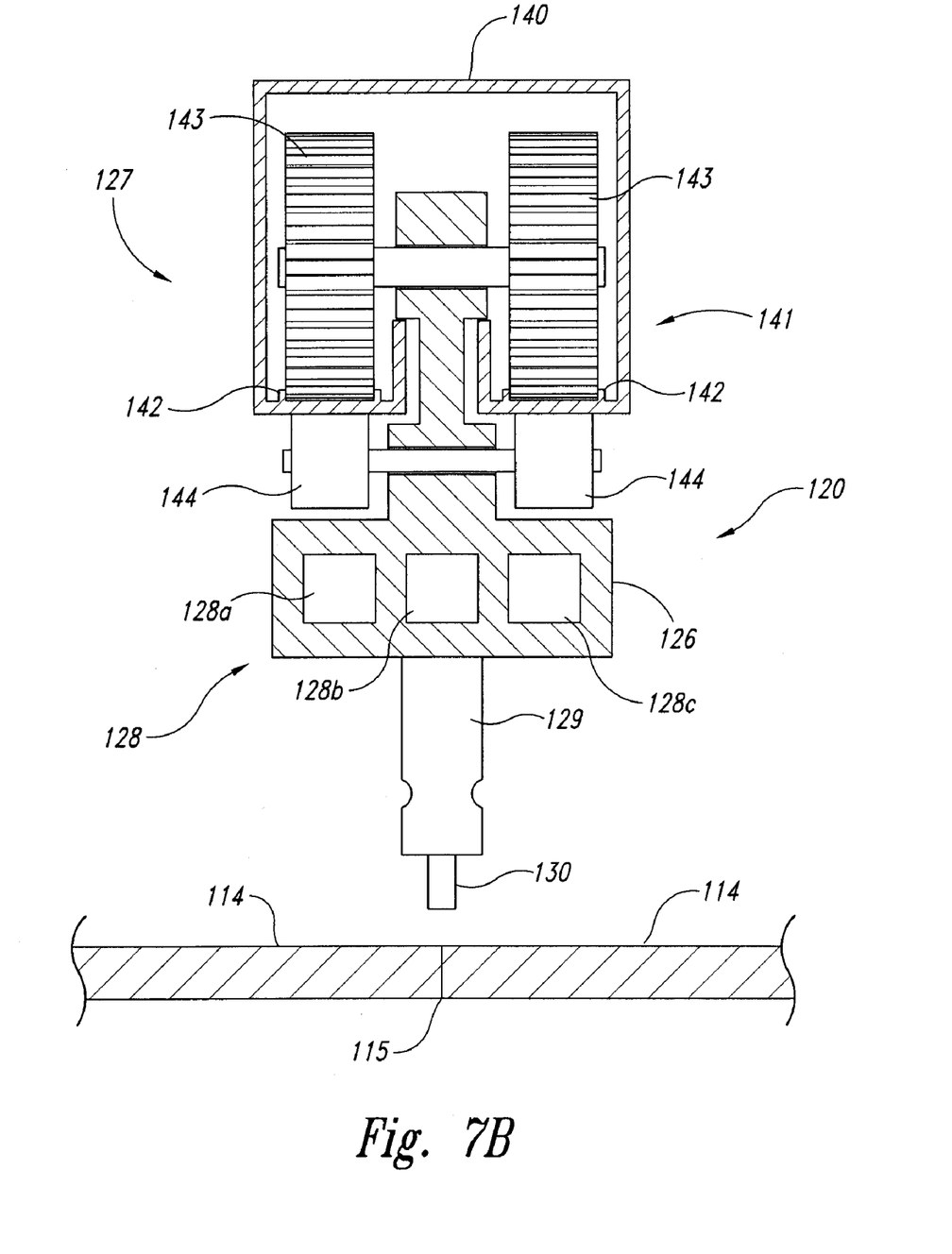
FIG. 7B is a partially schematic cross-sectional end view of an embodiment of the friction welding head and guide structure, taken generally along line 7B-7B of FIG. 7A.

FIG. 7B is a partially schematic, cross-sectional illustration of the guide structure 140 and modular head 120 shown in FIG. 7A. As shown in FIG. 7B, the engagement features 141 can include two racks 142, and two corresponding pinions 143. The pinions 143 can form a portion of a carriage 127 that is in turn connected to the rest of the head 120. The housing 126 of the head 120 can carry multiple actuators 128, including a travel actuator 128a (which rotatably drives the pinions 143), a force actuator 128b (which provides a normal force to the spindle 129), and a rotation actuator 128c (which rotates the spindle 129 about the spindle axis 132). The actuators 128 can include any suitable devices, including hydraulically powered devices, electrically powered devices, or pneumatically powered devices.

One aspect of embodiments of the system 100 described above with reference to FIGS. 1-7B is that they can include a single modular head 120 and a single controller 160, with each configured to perform different friction welding operations at different stations. One expected advantage of this arrangement is that it can reduce the cost of producing friction welds by reducing the number of welding heads and/or controllers required to form selected structures. For example, in one embodiment, a manufacturer need purchase and operate only a single controller 160 and a single modular head 120 to produce a fuel tank that normally requires three separate welding heads and three associated controllers.

In other embodiments, the system 100 can include multiple modular heads 120 and multiple controllers 160. Even in these embodiments, the cost of the overall system 100 may be less than the cost of conventional systems. For example, the modular heads 120, even if they number more than one, may be interchangeable with each other and may accordingly be manufactured as an off-the-shelf item rather than a custom item. Similarly, even if the system 100 includes multiple controllers 160, the controllers 160 may be interchangeable, thus reducing the cost of the controllers when compared with the cost of a custom manufactured controller.

From the foregoing, it will be appreciated that specific embodiments of the disclosure have been described herein for purposes of illustration, but that various modifications may be made without deviating from the disclosure. For example, while the foregoing embodiments were described generally in the context of a fuel tank, the foregoing techniques and systems may be used to form structures other than fuel tanks. Particular structures and methods were described in the context of friction stir welding, but may also be applicable to other welding techniques, including for example, friction plug welding. Modular heads can be interchangeable and/or movable among three stations, as shown in FIG. 3, or other numbers of stations (greater or less than three) in other embodiments.

Certain aspects of the embodiments described above may be combined or eliminated in other embodiments. For example, in many of the embodiments described above, the product upon which the modular head operates is supported by assembly tooling. In other embodiments, the assembly tooling may be reduced or eliminated, for example, if the modular head carries its own backing support for the product. Further, while advantages associated with certain embodiments have been described in the context of those embodiments, other embodiments may also exhibit such advantages, and not all embodiments need necessarily exhibit such advantages to fall in the scope of the present disclosure. Accordingly, the disclosure can include other embodiments not expressly shown or described above.

We claim:

1. A friction welding system, comprising:
   a carrier fixture positioned to carry a workpiece;
   a head support positioned proximate to the carrier fixture;
   a modular friction welding head releasably carried by the head support;
   a guide structure carried by at least one of the carrier fixture and the head support, wherein the modular friction welding head is movably coupled to the guide structure, the guide structure having a constrained motion path positioned to guide relative motion between the modular friction welding head and the carrier fixture, wherein the modular friction welding head includes:
      a spindle that is rotatable about a spindle axis;
      a probe projecting from the spindle along the spindle axis;
      a housing carrying the spindle;
      engagement features carried by the housing and positioned to releasably engage with the guide structure;
      a first actuator coupled to the spindle to rotate the spindle about a spindle axis;
      a second actuator coupled to the spindle to apply a force to the spindle generally along the spindle axis; and
      a third actuator coupled to the engagement features to move the engagement features relative to the motion path and move the modular friction welding head along the motion path; and
   a controller operatively coupled to the modular friction welding head and programmed with instructions to control operation of the friction welding head.

2. The system of claim 1 wherein the guide structure is carried by the head support and wherein the modular friction welding head is movable relative to the carrier fixture along the motion path.

3. The system of claim 2 wherein the modular friction welding head includes a travel actuator operatively coupled to the guide structure to move the modular friction welding head relative to the guide structure.

4. A friction welding system, comprising:
   a carrier fixture positioned to carry a workpiece;
   a head support positioned proximate to the carrier fixture;
   a modular friction welding head;
   a first guide structure carried by at least one of the carrier fixture and the head support, wherein the first guide structure has a first motion path positioned to guide relative motion between the modular friction welding head and the carrier fixture;
   a second guide structure having a second motion path, wherein the modular friction welding head is removably carriable, as a unit, by the first guide structure independent of the second guide structure, and by the second guide structure independent of the first guide structure, and wherein the modular friction welding head is movable along the first motion path when carried by the first guide structure independent of the second guide structure, and moveable along the second motion path when carried by the second guide structure independent of the first guide structure; and
   a controller operatively coupled to the modular friction welding head and programmed with instructions to control operation of the friction welding head.

5. The system of claim 1 wherein the modular friction welding head includes a modular friction stir welding head.

6. The system of claim 1 wherein the motion path is generally linear.

7. The system of claim 1 wherein the motion path is curved.

8. The system of claim 1 wherein the motion path is curved about an axis that is transverse to the spindle axis.

9. The system of claim 1, further comprising a releasable stop carried by the guide structure, the releasable stop being changeable between a first configuration with the stop positioned to prevent the modular stir friction welding head from moving off the constrained motion path, and a second configuration with the stop positioned to allow the modular stir friction welding head to be removed from the guide structure.

10. A friction welding system, comprising:
    a carrier fixture positioned to carry a workpiece;
    a head support positioned proximate to the carrier fixture;
    a guide structure carried by at least one of the carrier fixture and the head support independent of the workpiece, wherein at least a portion of the guide structure is spaced apart from the workpiece;
    a modular friction welding head movably coupled to the portion of the guide structure spaced apart from the workpiece, the guide structure having a constrained motion path positioned to guide relative motion between the modular friction welding head, the guide structure, and the carrier fixture, wherein the modular friction welding head includes:
       a spindle that is rotatable about a spindle axis;
       a probe projecting from the spindle along the spindle axis;
       a housing carrying the spindle; and
       engagement features carried by the housing and positioned to releasably engage with the portion of the guide structure spaced apart from the workpiece; and
    a controller operatively coupled to the modular friction welding head and programmed with instructions to control operation of the friction welding head.

11. The system of claim 10 wherein the guide structure is carried by the head support independent of the workpiece, and wherein the modular friction welding head is movable relative to the carrier fixture along the motion path.

12. The system of claim 10 wherein modular friction welding head is coupled directly to the guide structure and the guide structure is supported independent of the workpiece, and wherein the modular friction welding head is movable relative to the carrier fixture along the motion path.

13. The system of claim 10 wherein the modular friction welding head includes a travel actuator operatively coupled to the guide structure to move the modular friction welding head relative to the guide structure.

14. The system of claim 10 wherein the motion path is curved.

15. A friction welding system, comprising:
    a carrier fixture positioned to carry a workpiece;
    a head support positioned proximate to the carrier fixture;

a first guide structure carried by at least one of the carrier fixture and the head support independent of the workpiece, wherein at least a portion of the first guide structure is spaced apart from the workpiece;

a modular friction welding head, wherein the first guide structure has a first motion path positioned to guide relative motion between the modular friction welding head, the first guide structure, and the carrier fixture;

a second guide structure having a second motion path, and wherein the modular friction welding head is removably carriable, as a unit, by the first guide structure independent of the second guide structure, and by the second guide structure independent of the first guide structure, and wherein the modular friction welding head is movable along the first motion path when carried by the first guide structure independent of the second guide structure, and moveable along the second motion path when carried by the second guide structure independent of the first guide structure; and a controller operatively coupled to the modular friction welding head and programmed with instructions to control operation of the friction welding head.

* * * * *